(Model.)

A. W. TRYON.
King Bolt.

No. 241,895.  Patented May 24, 1881.

WITNESSES
J. R. Littell,
James A. Littell.

INVENTOR
Alonzo W. Tryon,
By his Attorneys
C. A. Snow & Co.

UNITED STATES PATENT OFFICE.

ALONZO W. TRYON, OF KENDALLVILLE, INDIANA.

KING-BOLT.

SPECIFICATION forming part of Letters Patent No. 241,895, dated May 24, 1881.

Application filed March 22, 1881. (Model.)

*To all whom it may concern:*

Be it known that I, ALONZO W. TRYON, of Kendallville, in the county of Noble and State of Indiana, have invented certain new and useful Improvements in Devices for Preventing the Breakage of Vehicle King-Bolts; and I do hereby declare that the following is a full, clear, and exact description thereof, which will enable others skilled in the art to which it appertains to make and use the same, reference being had to the accompanying drawings, which form a part of this specification.

The object of this invention is to provide means for preventing the breaking of the king-bolt of buggies or carriages when the wheels pass over uneven ground. To such end I arrange around the upper end of the king-bolt an elastic cushion, the said cushion being held upon the spring through which the king-bolt passes, substantially as hereinafter set forth and claimed.

Figure 1:
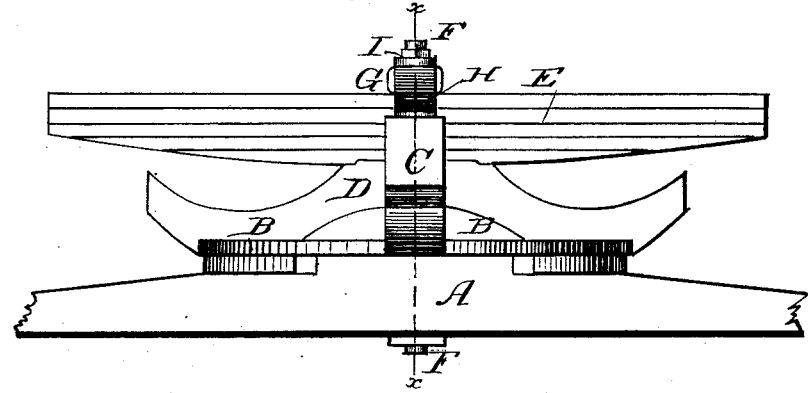
Figure 2:
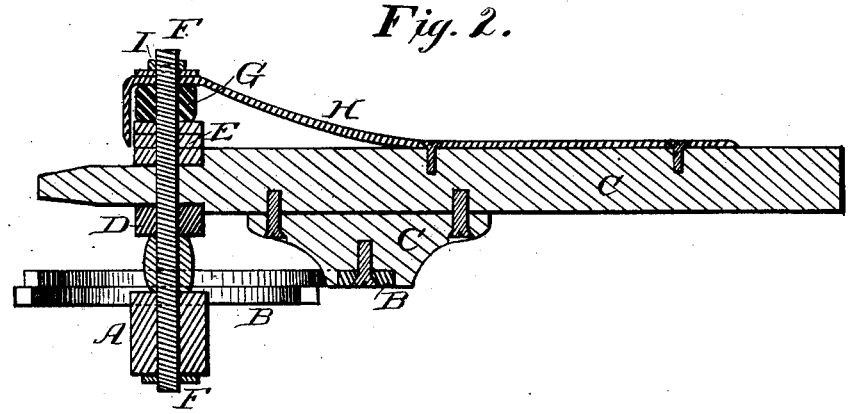

In the drawings, Figure 1 is a front view of the axle, fifth-wheel, spring, and the elastic cushion, and Fig. 2 is a section taken on a vertical central plane indicated by dotted line *x x*.

A indicates the axle, and B the fifth-wheel, the upper portion of the latter being connected with the reach C and with the curved-bar D upon which the spring E rests.

F indicates the king-bolt, which passes through the axle, the curved bar, and the spring. The upper end of the king-bolt extends above the spring, and around said upper end is placed an elastic cushion, G, of rubber or other equivalent material, the said cushion being held between the upper side and the spring and a strap, H, by means of a nut or head, I, on the upper end of the king-bolt. This strap is secured at its rear end to the reach, and at its forward end is bent down alongside of the elastic cushion and a portion of the spring. The king-bolt passes through this strap which is provided with a perforation for such purpose. By this arrangement when either of the wheels is suddenly raised or lowered during the passage of the vehicle over rough or uneven ground, the elastic cushion will take up the shock and yield sufficiently to prevent breakage of the king-bolt.

What I claim, and desire to secure by Letters Patent, is—

The combination, with the king-bolt, of the spring through which the king-bolt passes, and an elastic cushion seated upon the spring and held upon the king-bolt by the strap H, interposed between the cushion and the head of the bolt, substantially as set forth.

In testimony that I claim the foregoing as my own I have hereto affixed my signature in presence of two witnesses.

ALONZO W. TRYON.

Witnesses:
C. H. MCMILLAN,
J. R. BAKER.